Patented Dec. 19, 1950

2,534,533

UNITED STATES PATENT OFFICE 2,534,533

METHODS OF PREPARING ALKALI METAL BOROHYDRIDES

Hermann I. Schlesinger, Chicago, Ill., and Herbert C. Brown, Detroit, Mich.

No Drawing. Application November 5, 1945, Serial No. 626,900

20 Claims. (Cl. 23—14)

This invention relates to alkali metal borohydrides and to methods of preparing these new compounds.

The alkali metal borohydrides of this invention are new compounds which we have discovered, and have many desirable and beneficial properties. Sodium borohydride is a solid that is stable in dry air and reacts only very slowly in moist air. It may be heated in vacuo to above 400° C. without noticeable decomposition. It does not catch fire in air unless heated to high temperatures, and is very soluble in water. It reacts with water to liberate hydrogen, and if the water is at room temperature or lower, the liberation of hydrogen is slow. If the water is cold a large proportion of the borohydride may be regained by evaporating the water at low temperature. The evolution of hydrogen is accelerated by rise of temperature or by mixing accelerators with the borohydride. The use of these accelerators will be described in detail hereinafter. The properties of lithium and potassium borohydrides are, with few minor differences, like those of sodium borohydride. The alkali metal borohydrides serve as an excellent source of hydrogen, and they are very powerful reducing agents. The available hydrogen from the borohydrides is greater per unit weight of the reagent than from other commonly used sources. Thus with lithium borohydride 4.11 liters of hydrogen at standard conditions is obtainable per gram of borohydride; while with sodium borohydride 2.37 liters are obtainable per gram. The heat of reaction of the alkali metal borohydride with water is relatively low, so that the hydrogen evolved need not be cooled.

One method of preparing the alkali metal borohydrides is by treating an alkali metal hydride with an alkyl borate. When reacting sodium hydride with methyl borate the reaction is as follows:

4NaH+B(OCH$_3$)$_3$→NaBH$_4$+3NaOCH$_3$ (1)

In an example of the above reaction an apparatus is provided having a stirring device, a reflux condenser and a thermometer well. The apparatus is flushed out with dry nitrogen, and sodium hydride in powdered form is introduced into the apparatus without contacting it with air and moisture. The sodium hydride is slowly heated to between 200° and 275° C., and the methyl borate is added at such a rate that the theoretical amount is introduced over a period of 40 to 60 minutes. During the adding of the methyl borate the reacting materials are vigorously stirred. After all the borate has been added the temperature is maintained and the stirring is continued until the reaction is complete. This length of time, which will ordinarily be from 10 minutes to 2 hours, depends upon the temperature, the effectiveness of stirring, the fineness of the alkali metal hydride, and the like. As soon as the reaction is complete the product is cooled and treated with a solvent to extract the borohydride from the sodium or other alkali metal alkoxide. Suitable solvents include liquid ammonia, primary, secondary and tertiary amines, such as methylamine, ethylamine, isopropylamine, diethylamine, ethylene diamine, pyridine, and derivatives of such amines containing ether linkages as well as ethers themselves which do not react with the reaction mixture at the temperature of the extraction process. In general, ammonia and the lower aliphatic primary amines are preferred.

It has been found that it is sometimes advisable to preheat the alkali metal hydride at 200° C. or higher before the addition of alkyl borate. This preheating increases the yield. It has also been discovered that it is sometimes advisable to add the crude reaction product from a previous run to the reacting materials.

In a specific example of the above preparation methyl borate was added to sodium hydride at such a rate that the theoretical amount was added in 25 minutes. During this addition the sodium hydride was maintained at 230–270° C. The reaction was substantially complete after heating at 270° C. for 10 minutes, and the yield was 87% with the product being 93.3% pure.

In another example, methyl borate is added to sodium hydride over a 40 minute interval, while the hydride is maintained at 245°–255° C. The sodium hydride had been previously heated for 75 minutes at this temperature, before any methyl borate was added. After all the borate had been added the reacting mixture was maintained at 250–260° C. for 60 minutes, and the total yield was 86% with the borohydride being 91% pure.

In still another example, sodium hydride was heated for 75 minutes at 245–255° C., and the crude product of a previous run was added to the hydride. Methyl borate was added to the mixture over a 40 minute interval while the reacting mixture was maintained at the temperature of 245–255° C. After heating the final mixture at 250–260° C. for 60 minutes the reaction was complete, with a total yield of 94%, and the product was 98% pure.

In a fourth example ethyl borate was added to sodium hydride over a 20 minute interval while heating was maintained at 220° C. After all of the borate had been added the mixture was heated for 120 minutes at 220° C., at which time the reaction was complete. The total yield was 87%, and the product was 86% pure.

In typical production runs, in five gallon autoclaves, 8 pounds of methyl borate of 99.5% purity was added as vapor to 8 pounds of sodium hydride of 94% purity in each autoclave, the hydride thus being 2% in excess of the theoretical amount. The addition of methyl borate was uniform over a period of two hours and the charge was cooked for an additional hour. Throughout the run the temperature was maintained at 260° C. and the pressure was kept below 150 pounds per square inch gauge pressure by occasional venting. The charge was continuously agitated. The 16 pounds of product, a free-flowing powder, contained 2.5 pounds of sodium borohydride, a yield of 86% on the methyl borate. In continuous operation each autoclave cycle required 6.3 hours.

In the next operation, 45 pounds of the above autoclave product were extracted at one time with 24 gallons of isopropylamine at room temperature, and the residue was washed with 12 gallons of additional isopropylamine. These washings were saved to form part of the extraction solvent for the next batch. The main filtrate from the extraction was evaporated to obtain 7.5 pounds of product containing 92% sodium borohydride. The recovery of sodium borohydride was 98%.

In each of the above examples the reacting materials were maintained out of contact with air and moisture.

The alkali metal borohydrides may also be prepared by heating an alkali metal hydride with an alkali metal alkoxy borohydride. This reaction when using sodium hydride and sodium trimethoxy borohydride, is as follows:

$$3NaH + NaBH(OCH_3)_3 \rightarrow NaBH_4 + 3NaOCH_3 \quad (2)$$

In this reaction the procedure is essentially the same as when an alkali metal hydride is reacted with an alkyl borate, the exception being that the alkali metal hydride and the alkali metal alkoxy borohydride are both solids and are mixed together before heating is started. A reaction similar to Equation 2 occurs between sodium hydride and sodium tetramethoxy borohydride to produce sodium borohydride. The alkali metal alkoxy borohydrides would perhaps be ordinarily called alkali metal methoxy borates.

Alkali metal borohydrides may also be prepared by heating mixtures of an alkali metal and an alkyl borate with hydrogen under pressure. When sodium is used in the proportions of the equation:

$$4Na + 2H_2 + (CH_3O)_3B \rightarrow NaBH_4 + 3NaOCH_3 \quad (3)$$

sodium borohydride was obtained. The pressure maintained throughout the time of reaction during one test was 1,000 lbs. per sq. in. measured at 21° C. The temperature was about 200°–275° C.

Another method of making an alkali metal borohydride is to heat an alkali metal hydride with boric oxide. When sodium hydride is used the reaction is probably as follows:

$$4NaH + 2B_2O_3 \rightarrow NaBH_4 + 3NaBO_2 \quad (4)$$

This reaction requires a higher temperature than the others, with the temperature being from about 300°–375° C. with the heating being maintained for 46 hours or more.

The alkali metal borohydrides serve as excellent sources for hydrogen as hydrogen is evolved by merely adding water, and the following reaction takes place:

$$MBH_4 + 2H_2O \rightarrow MBO_2 + 4H_2 \quad (5)$$

where M is an alkali metal. The reaction proceeds rather slowly, especially when cold water or water at ordinary room temperature is used. As the reaction progresses it becomes slower and slower, due to the inhibiting effect of increasing alkalinity. To overcome the slowness and incompleteness of the hydrogen evolution we have developed accelerators to be mixed with the borohydrides. These accelerators can be divided into two classes, which are called acidic accelerators and catalytic accelerators. The acidic accelerators are solid substances which give an acid reaction in water and include such materials as boric oxide, phosphorus pentoxide, oxalic acid and other carboxylic acids, ammonium chloride, and related substances, or mixtures of these. Thus a mixture of equal weights of boric oxide and sodium borohydride gives rapid, complete evolution of hydrogen at room temperature. When boric oxide is used as the accelerator the boron appears in the reaction product as hydrated $Na_2B_4O_7$ (Borax), which partly precipitates as the solution cools. No appreciable amount of any such solid is formed with the catalytic accelerator.

The catalytic accelerators include salts of heavy metals and acids. The term "heavy metals" indicates metals other than alkali and alkaline earth metals. An effective accelerator of this type is cobaltous chloride. 5 to 10 parts of this material added to 100 parts by weight of sodium borohydride cause complete interaction in a few minutes. Nickel, copper, iron, and other metal salts have also been used, and other salts of acids besides chlorides have also been used.

Immediately on addition of water to the mixture of solid borohydride and catalytic accelerator a black colloidal suspension is formed. It is possible to coagulate this suspension to a solid which may be removed from the water. This solid when added to a water solution of the borohydride also catalyzes hydrogen evolution but is not as effective as the material formed directly by action of water on the solid mixture. It thus appears that the black material is not as effective as the original suspension for the reasons that, first, coagulation reduces the surface area, and, second, the solid deteriorates in air. If the black solid is obtained under conditions which exclude all but traces of air it inflames spontaneously when subsequently exposed to air. The solid obtained without exclusion of air is not inflammable, undoubtedly because some reaction with air has already occurred. This probably decreases its effectiveness in producing hydrogen.

It has been found that for best results the accelerator should be mixed with the borohydride before adding water, but separate addition of accelerator and borohydride is also effective.

The metallic salts, or catalytic accelerators, are preferred over the acidic accelerators because of the small quantity required. Thus 4 parts by weight of anhydrous cobaltous chloride produce approximately the same acceleration as do 100 parts of boric oxide when added to 100 parts of sodium borohydride. Hydrated metallic salts should not be used as accelerators as they react with the borohydride before liquid water is added.

In using alkali metal borohydrides as a source of hydrogen, trouble is sometimes encountered in the foaming which often accompanies its reaction with water. This foaming appears to be more pronounced when the metallic salts or catalytic accelerators are used. The foaming can be controlled, however, by using small amounts of anti-foaming agents. Any commercial anti-foaming agent designed for use in alkaline solutions may be used.

In the commercial production of hydrogen it is convenient to have a mixture of alkali metal borohydrate and accelerator compressed into pellets of desired weight and size. These pellets can then be dropped into water, or water can be added to the pellets. The latter is the more convenient procedure.

The new compound: sodium borohydride is disclosed and claimed in our prior Patent No. 2,461,661, dated February 15, 1949, which discloses and claims the preparation of an alkali metal borohydride by reacting diborane and an alkali metal alkoxyborohydride. Our Patent No. 2,461,662, dated February 15, 1949, discloses and claims the preparation of an alkali metal borohydride by reacting diborane and an alkali metal alkoxide. In our Patent No. 2,461,663, dated February 15, 1949, we disclose and claim the preparation of an alkali metal borohydride by reacting diborane with an alkali metal tetra-alkoxyborate.

Having described our invention in considerable detail it is our intention that the invention be not limited to any of the details of description unless otherwise specified, but rather be construed broadly within its spirit and scope as set out in the accompanying claims.

We claim:

1. The method of preparing an alkali metal borohydride which comprises heating an alkali metal hydride at a reaction temperature with an alkyl borate at a temperature not substantially less than 200° C. in the substantial absence of air and moisture, the proportion of alkali metal hydride being in excess of one mole of alkali metal hydride per mole of alkyl borate.

2. The method of preparing an alkali metal borohydride which comprises heating an alkali metal hydride with an alkali metal alkoxy borohydride at a temperature not substantially less than 200° C. in the substantial absence of air and moisture.

3. The method of preparing sodium borohydride which comprises heating sodium hydride with methyl borate at a temperature not substantially less than 200° C. in the substantial absence of air and moisture, the proportion of sodium hydride being in excess of one mole of the hydride per mole of methyl borate, cooling, and separating the borohydride from the other components of the crude reaction product.

4. The method of preparing sodium borohydride which comprises heating sodium hydride with sodium methoxy borohydride at 200°–275° C. in the substantial absence of air and moisture, cooling, and separating the borohydride from the other components of the crude reaction product.

5. The method of claim 4 wherein the borohydride is separated from the other components of the crude reaction product by dissolving the borohydride in a member of the group consisting of ammonia and amines.

6. The method of preparing an alkali metal borohydride which comprises heating a mixture of an alkali metal, hydrogen, and an alkyl borate under pressure at 200°–275° C. and in the substantial absence of air and moisture.

7. The method of preparing sodium borohydride which comprises heating a mixture of sodium, hydrogen, and methyl borate under pressure at 200°–275° C. and in the substantial absence of air and moisture, cooling, and separating the borohydride.

8. The method of preparing an alkali metal borohydride which comprises heating an alkali metal hydride with boric oxide at 300°–375° C. in the substantial absence of air and moisture.

9. The method of preparing sodium borohydride which comprises heating sodium hydride with boric oxide at 330°–350° C. in the substantial absence of air and moisture, and separating the borohydride.

10. The method of preparing an alkali metal borohydride which comprises heating an alkali metal hydride at a temperature not substantially less than 200° C. with a member of the class consisting of alkyl borates, alkoxy borohydrides and boric oxide, the proportion of alkali metal hydride being in excess of one mole of the alkali metal hydride per mole of said member of said class.

11. The method of preparing an alkali metal borohydride which comprises heating an alkali metal hydride with an alkyl borate at a temperature of 200°–275° C. in the substantial absence of air and moisture, the proportion of alkali metal hydride being in excess of one mole of the alkali metal hydride per mole of alkyl borate.

12. The method of preparing an alkali metal borohydride which comprises preheating an alkali metal hydride, associating the heated alkali metal hydride with an alkyl borate and heating at a temperature not substantially less than 200° C. in the substantial absence of air and moisture, the proportion of alkali metal hydride being in excess of one mole of the alkali metal hydride per mole of alkyl borate.

13. The method of preparing an alkali metal borohydride which comprises preheating an alkali metal hydride at a temperature of about 200°–275° C. and associating the alkali metal hydride with an alkyl borate at a temperature of 200°–275° C. in the substantial absence of air and moisture, the proportion of alkali metal hydride being in excess of one mole of the alkali metal hydride per mole of alkyl borate.

14. The method of preparing an alkali metal borohydride which comprises heating an alkali metal hydride with an alkyl borate at a temperature not substantially less than 200° C. in the substantial absence of air and moisture, the proportion of alkali metal hydride being in excess of one mole of the alkali metal hydride per mole of alkyl borate, said alkali metal hydride being mixed with the crude reaction product of a previous run before being heated.

15. The method of preparing sodium borohydride which comprises heating sodium hydride with methyl borate at 200°–275° C. in the substantial absence of air and moisture, cooling, and separating the borohydride from the other components of the crude reaction product, the proportion of sodium hydride being in excess of one mole of the sodium hydride per mole of methyl borate.

16. The method of preparing an alkali metal borohydride which comprises heating an alkali metal hydride with an alkali metal alkoxy borohydride at a temperature of about 200°–275° C. in the substantial absence of air and moisture.

17. The method of preparing sodium borohydride which comprises heating sodium hydride with methyl borate at 200°–275° C. in the substantial absence of air and moisture, the proportion of sodium hydride being in excess of one mole of the hydride per mole of methyl borate, cooling and separating the borohydride from the other components of the crude reaction product by dissolving the borohydride in a solvent in which said other components are substantially insoluble.

18. The method of preparing sodium borohydride which comprises heating sodium hydride with sodium methoxy borohydride at 200°–275° C. in the substantial absence of air and moisture, cooling and separating the borohydride from the other components of the crude reaction product by dissolving the borohydride in a solvent in which said other components are substantially insoluble.

19. The method of preparing sodium borohydride which comprises heating sodium hydride with methyl borate at 200°–275° C. in the substantial absence of air and moisture, the proportion of sodium hydride being in excess of one mole of the hydride per mole of methyl borate, cooling and separating the borohydride from the other components of the crude reaction product by dissolving the borohydride in a member of the group consisting of ammonia and amines.

20. The method of preparing an alkali metal borohydride which comprises heating an alkali metal hydride with an alkali metal alkoxy borohydride at a temperature not substantially less than 200° C. in the substantial absence of air and moisture, said alkali metal hydride and alkali metal alkoxy borohydride being mixed with the crude reaction product of a previous run before being heated.

HERMANN I. SCHLESINGER.
HERBERT C. BROWN.

REFERENCES CITED

The following references are of record in the file of this patent:

UNITED STATES PATENTS

| Number | Name | Date |
|---|---|---|
| 2,461,661 | Schlesinger | Feb. 15, 1949 |

OTHER REFERENCES

"Chemical Reviews," vol. 31, Aug. 1942, article by Schlesinger et al., page 33.